(12) United States Patent
Harada et al.

(10) Patent No.: US 7,522,472 B2
(45) Date of Patent: Apr. 21, 2009

(54) OBSTACLE DETECTION SYSTEM

(75) Inventors: Taketo Harada, Obu (JP); Yoshihisa Sato, Nagoya (JP)

(73) Assignee: Denso Corporation, Kariya (JP)

( * ) Notice: Subject to any disclaimer, the term of this patent is extended or adjusted under 35 U.S.C. 154(b) by 209 days.

(21) Appl. No.: 11/798,687

(22) Filed: May 16, 2007

(65) Prior Publication Data
US 2007/0291590 A1 Dec. 20, 2007

(30) Foreign Application Priority Data
Jun. 16, 2006 (JP) .............................. 2006-166959

(51) Int. Cl.
*G01S 15/93* (2006.01)

(52) U.S. Cl. ........................ 367/98; 367/900; 367/99; 367/909

(58) Field of Classification Search .................. 367/99, 367/98, 900, 909, 112
See application file for complete search history.

(56) References Cited

U.S. PATENT DOCUMENTS

2007/0291590 A1* 12/2007 Harada et al. ................. 367/99

FOREIGN PATENT DOCUMENTS

| JP | 63-157085 | 6/1988 |
| JP | 2003-063335 | 3/2003 |
| JP | 2003-081035 | 3/2003 |

* cited by examiner

*Primary Examiner*—Dan Pihulic
(74) *Attorney, Agent, or Firm*—Nixon & Vanderhye, PC

(57) ABSTRACT

An obstacle detection system has multiple ultrasonic sonars. When a threshold value used for determining an existence of an obstacle is compared with a receiving signal having been amplified at a predetermined gain, the sonar having a receiving mode is provided with the gain which is higher than that of the sonar having a sending/receiving mode. Thus, the sensitivity of the sonar having the receiving mode can be improved so that a continuous sound field of the sonar is broadened. Accordingly, the distance of the border of the continuous sound field of the obstacle detection system from the vehicle can become substantially even.

6 Claims, 6 Drawing Sheets

OBSTACLE DETECTION SYSTEM

CROSS REFERENCE TO RELATED APPLICATION

This application is based on a Japanese Patent Application No. 2006-166959 filed on Jun. 16, 2006, the disclosure of which is incorporated herein by reference.

FIELD OF THE INVENTION

The present invention relates to an obstacle detection system.

BACKGROUND OF THE INVENTION

Generally, a vehicle is provided with an obstacle detection device for detecting an obstacle near the vehicle by ultrasonic sonars which are mounted to a bumper of the vehicle. The obstacle detection device will generate an alarm for a driver of the vehicle when the obstacle is detected. In this case, with reference to JP-2003-63335A, the time which elapsed from the sending of an ultrasonic transmitting wave by the ultrasonic sonar to the receiving of a reflection wave from the obstacle as a receiving wave is measured. Moreover, the distance between the vehicle and the obstacle is calculated based on the measured time.

In the case where this distance is smaller than a predetermined value, the alarm is generated. In this case, the ringing manner of the alarm is changed in accordance with the distance between the vehicle and, the obstacle, for example. Thus, it is more necessary for the driver to be called attention to the obstacle with the obstacle being nearer the vehicle.

For example, in the case where there exists an obstacle within a first field (that is, distance between obstacle and bumper is smaller than first predetermined value), the alarm of a continuous sound is generated. In the case where there exists an obstacle within a second field (that is, distance between obstacle and bumper is larger than first predetermined value and smaller than second predetermined value), the alarm of an intermittent sound is generated. The second predetermined value is larger than the first predetermined value. In following, the first field and the second field are respectively called a continuous sound field and an intermittent sound field.

In this case, the multiple ultrasonic sonars are arranged close to each other, in order that the distance of the boundary between the continuous sound field and the intermittent sound field from the vehicle becomes even. As described, different ringing manners are respectively provided at two sides of the boundary. Thus, as shown in FIG. 7, the continuous sound fields of the ultrasonic sonars are continuous with each other, so that the distance of the boundary (that is, border of continuous sound field) between the continuous sound field and the intermittent sound field from the vehicle is substantially equal to the first predetermined value, and the distance of the border of the intermittent sound field from the vehicle is substantially equal to the second predetermined value.

However, in this case, because the multiple ultrasonic sonars are arranged close to each other, the two adjacent ultrasonic sonars are respectively set to have a sending/receiving mode to send the transmitting wave and receiving the receiving wave and a receiving mode to only receive the receiving wave (that is, sending is not performed). Thus, the generation timing of the transmitting wave from the ultrasonic sonars are deviated from each other. The obstacle is detected according to the following procedure. That is, after the detection of the distance between the vehicle and the obstacle based on the transmitting wave sent by the one of the ultrasonic sonars is finished, the another one of the ultrasonic sonars adjacent to the one thereof is subsequently made send the transmitting wave so that the detection of the distance of the obstacle is similarly performed. Thus, it can be discriminated with respect to the transmitting wave of which of the ultrasonic sonars the ultrasonic sonars receive the receiving wave, while the distance of the obstacle can be detected by the multiple ultrasonic sonars.

Figure 7:
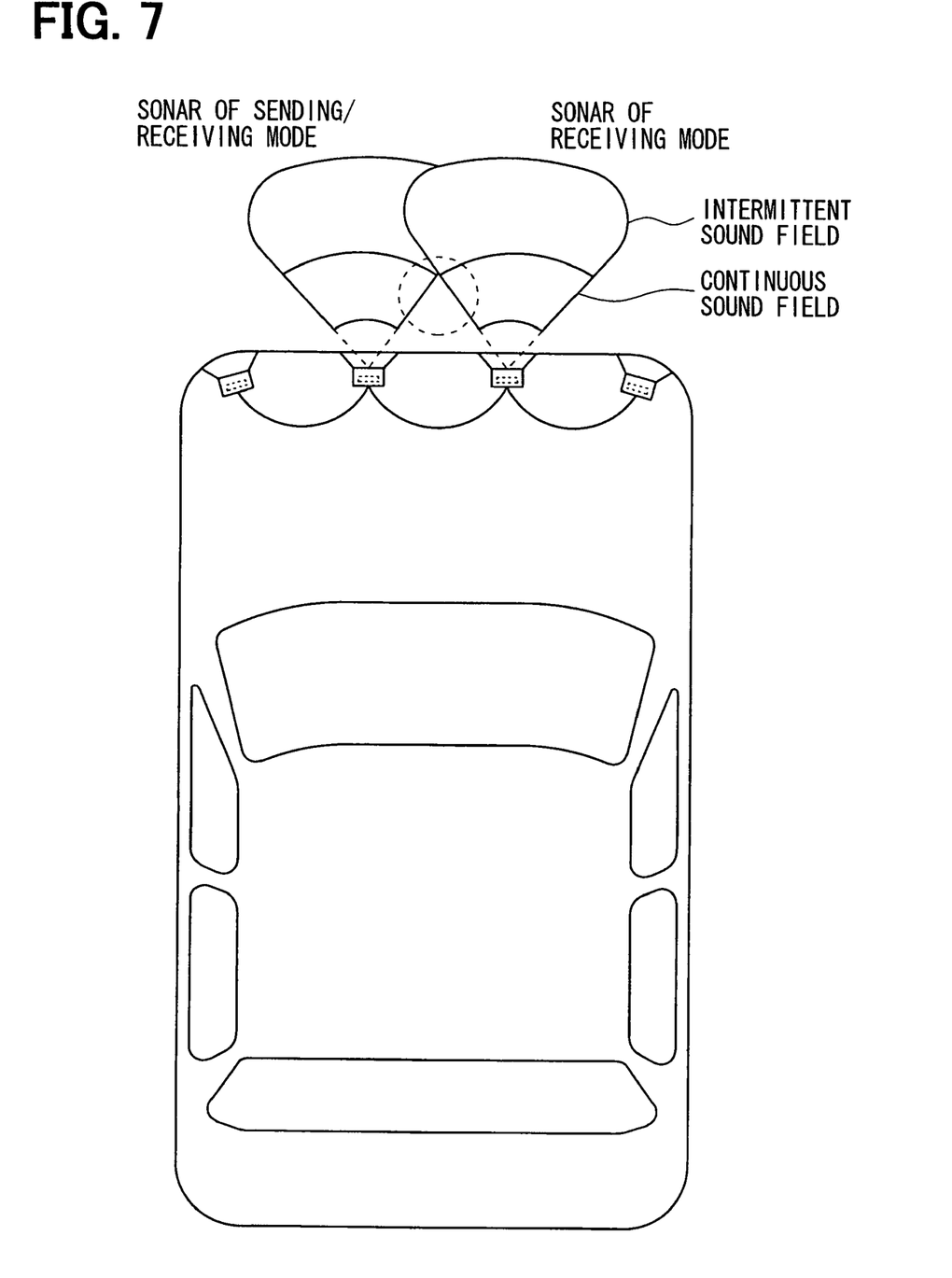
FIG. 7 is a schematic view showing a state of a continuous sound field and an intermittent sound field where an obstacle detection system has different ringing manners according to a comparison example.

However, as shown in FIG. 7, at the part (which is surrounded by broken line in FIG. 7) where the continuous sound fields of the adjacent ultrasonic sonars which border each other, the distances between the vehicle and the positions at the border of the continuous field becomes uneven. That is, the obstacle detection distance of the obstacle detection device becomes uneven.

SUMMARY OF THE INVENTION

In view of the above-described disadvantage, it is an object of the present invention to provide an obstacle detection system having a substantially even obstacle detection distance by ultrasonic sonars.

The following investigation has been performed by the inventor of the present invention. As described above, when one of multiple ultrasonic sonars is made generate the transmitting wave, the one of the sonars can be set to have the sending/receiving mode and another one of the ultrasonic sonars adjacent to the one thereof can be set to have the receiving mode because the multiple ultrasonic sonars are arranged close to each other. In this case, a threshold value (for determining existence of obstacle) and a gain (for receiving) of the another one of the sonars 2 (which is adjacent to the one of sonars 2) provided with the receiving mode are respectively provided with same values as those of the another one of the sonars 2 when the another one of the sonars 2 is provided with the normal sending/receiving mode.

The gain for receiving and the threshold value used for determining the existence of the obstacle at the sending/receiving mode are determined with taking reverberation (that is, the state where attenuation of ultrasound is not complete after vibration of oscillator of sonar stopped) into consideration when the sonar provided with the sending/receiving mode is made generate the transmitting wave.

Specifically, the receiving wave which has been received is amplified at the predetermined gain, and the amplified signal is compared with the threshold value. In the case where the amplified signal is larger than the threshold signal, it is determined that there exists the obstacle having a distance (from vehicle or the like) calculated according to the time when the receiving time is received.

In this case, the period until the reverberation disappears is set as a masking time, and the comparison with the threshold value is performed after the masking time elapsed. Moreover, the threshold value is set with taking noise into consideration. For example, because noise which may occurs in accordance with the distance from the vehicle can be determined, the threshold value is set in such a manner that the noise can be discriminated from the obstacle. Because the amplified signal (which is acquired by amplifying receiving signal) easily exceeds the threshold value when the threshold value is lowered, the ranges of the continuous sound field and the intermittent sound field can be broadened. Thus, the detectable distance of the obstacle becomes large and the obstacle detection sensitivity is improved. Accordingly, the threshold value is set in accordance with the ranges which are desirably set as the continuous sound field and the intermittent sound field, that is, in accordance with the distance which is desirably set as the obstacle detection distance.

On the other hand, the gain which is an amplification rate determines the ranges of the continuous sound field and the intermittent sound field. The gain is set based on a relation with the threshold value, in such a manner that noise having been amplified at the predetermined gain does not exceed the threshold value. With the increase of the gain, the amplified signal (at predetermined gain) of the receiving wave will become large to easily exceed the threshold value. That is, even when the gain is increased, the obstacle detection distance becomes large and the obstacle detection sensitivity is improved because the ranges of the continuous sound field and the intermittent sound field become broad. Therefore, the gain can be also set in accordance with the ranges which are desirably set as the continuous sound field and the intermittent sound field.

As described above, the gain and the threshold value are set with taking the reverberation and the sending time of the transmitting wave into consideration, in the case where the sonar is provided with the sending/receiving mode. In the case where the sonar is provided with the receiving mode, it is unnecessary to set the gain and the threshold value with taking the reverberation into consideration because the sonar itself does not generate the transmitting wave. Therefore, the sonar having the receiving mode can be provided with an increased gain or a lowered threshold value, so that the obstacle detection sensitivity can be improved. Thus, the continuous sound field of the sonar having the receiving mode can be enlarged at the part (surrounded by broken line in FIG. 7) where the continuous sound fields of the two adjacent sonars borders each other, so that the distance of the border of the continuous sound field from the vehicle can become substantially even.

According to a first aspect of the present invention, the obstacle detection system is provided with a plurality of ultrasonic sonars which are mounted to a vehicle and arrayed thereat and each of which has a microphone for sending ultrasound as transmitting wave and receiving reflection wave reflected by an obstacle from the sending wave as receiving wave, a control unit for determining one of the ultrasonic sonars to be provided with a sending/receiving mode for sending the transmitting wave and receiving the receiving wave and another one of the ultrasonic sonars adjacent to the one thereof to be provided with a receiving mode for only receiving the receiving wave, an alarm unit for providing an alarm in according with a distance between the vehicle and the obstacle, an amplifier for amplifying a signal received by the microphone to output an amplified signal, a comparison unit for comparing the amplified signal with a threshold value used for determining whether or not the obstacle exists, a calculation unit for calculating the distance between the vehicle and the obstacle, and a gain adjustment unit for adjusting a gain when the signal received by the microphone is amplified by the amplifier. When it is determined by the comparison unit that the amplified signal is larger than the threshold value, the receiving wave which is received is determined to be the reflection wave from the transmitting wave which is reflected, and the calculation unit calculates the distance between the vehicle and the obstacle based on the time which elapsed from the sending of the transmitting wave to the receiving of the receiving wave. The ultrasonic sonar which is set to have the receiving mode by the control unit is provided with the gain, which is adjusted by the gain adjustment unit to be higher than the gain of the ultrasonic sonar which is set to have the sending/receiving mode.

Thus, when the threshold value used for determining the existence of the obstacle is compared with the signal amplified at the predetermined gain, the sonar having the receiving mode is provided with the gain which is higher than that of the sonar having the sending/receiving mode. Thus, the sensitivity of the sonar having the receiving mode can be improved so that a continuous sound field of the sonar having the receiving mode is broadened at the part where the continuous sound fields of the adjacent sonars border each other. Accordingly, the distance of the border of the continuous sound field of the obstacle detection system from the vehicle can become substantially even.

According to a second aspect of the present invention, the obstacle detection system is provided with a plurality of ultrasonic sonars which are mounted to a vehicle and arrayed thereat and each of which has a microphone for sending ultrasound as transmitting wave and receiving reflection wave reflected by an obstacle from the sending wave as receiving wave, a control unit for determining one of the ultrasonic sonars to be provided with a sending/receiving mode for sending the transmitting wave and receiving the receiving wave and another one of the ultrasonic sonars adjacent to the one thereof to be provided with a receiving mode for only receiving the receiving wave, an alarm unit for providing an alarm in according with a distance between the vehicle and the obstacle, an amplifier for amplifying a signal received by the microphone to output an amplified signal, a comparison unit for comparing the amplified signal with a threshold value used for determining whether or not the obstacle exists, a calculation unit for calculating the distance between the vehicle and the obstacle, and a threshold value adjustment unit for adjusting the threshold value. When it is determined by the comparison unit that the amplified signal is larger than the threshold value, the receiving wave which is received is determined to be the reflection wave from the transmitting wave which is reflected, and the calculation unit calculates the distance between the vehicle and the obstacle based on the time which elapsed from the sending of the transmitting wave to the receiving of the receiving wave. The ultrasonic sonar which is set to have the receiving mode by the control unit is provided with the threshold value, which is adjusted by the threshold value adjustment unit to be smaller than the threshold value of the ultrasonic sonar which is set to have the sending/receiving mode.

Thus, the ultrasonic sonar having the receiving mode is provided with the threshold value which is smaller than that of the ultrasonic sonar when being provided with the sending/receiving mode. In this case, even when the threshold value for determining whether or not the obstacle exists is lowered, the sensitivity for detecting the obstacle by the sonar having the receiving mode can be improved. Thus, the similar effects to the first aspect of the present invention can be provided.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

First Embodiment

An obstacle detection system according to a first embodiment of the present invention will be described with reference to FIGS. 1-5. The obstacle detection system can be suitably used for a vehicle, for example.

Figure 1:
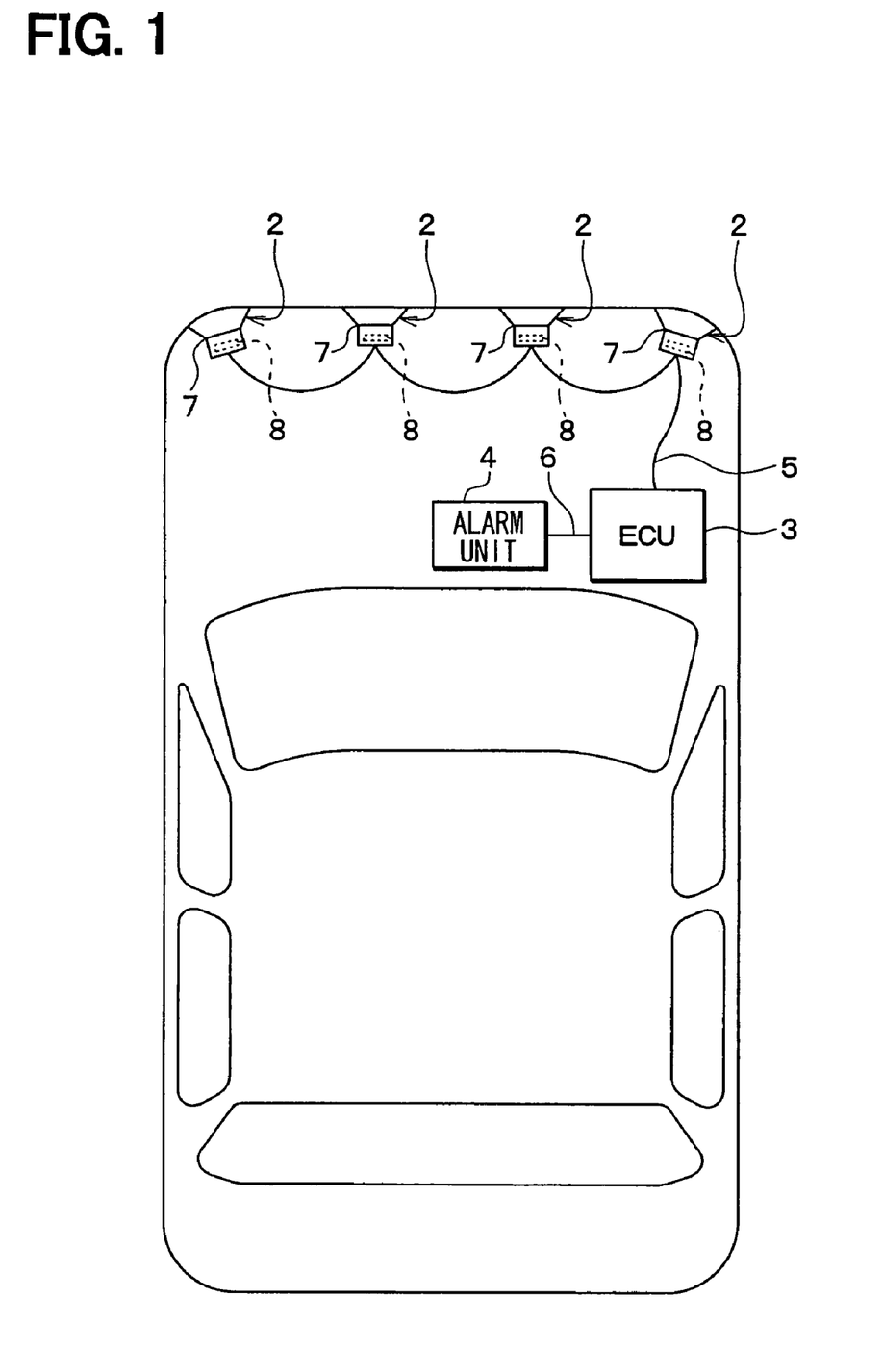
FIG. 1 is a schematic view showing an obstacle detection system according to a first embodiment of the present disclosure.

As shown in FIG. 1, the obstacle detection system which is attached to the vehicle includes multiple ultrasonic sonars 2, a control unit 3 (for example, ECU) and an alarm unit 4. The multiple sonars 2 are respectively communicated with the ECU 3 through a LAN cable 5. The ECU 3 and the alarm unit 4 are connected with each other through a LAN 6, so that an alarm command signal and the like can be transmitted from the ECU 3 to the alarm unit 4.

The sonar 2 is fixed to a component (such as bumper of vehicle front portion or that of vehicle rear portion) of a chassis of the vehicle, and has a microphone 7 for sending a transmitting wave and receiving a receiving wave. For example, the sonar 2 can be arrayed in the vehicle width direction and arranged closed to each other.

The microphone 7 is provided with an oscillator (not shown), which can be excited to vibrate so as to generate ultrasound as the transmitting wave and can vibrate when the receiving wave is transmitted thereto. Thus, the receiving wave can be detected.

Figure 2:
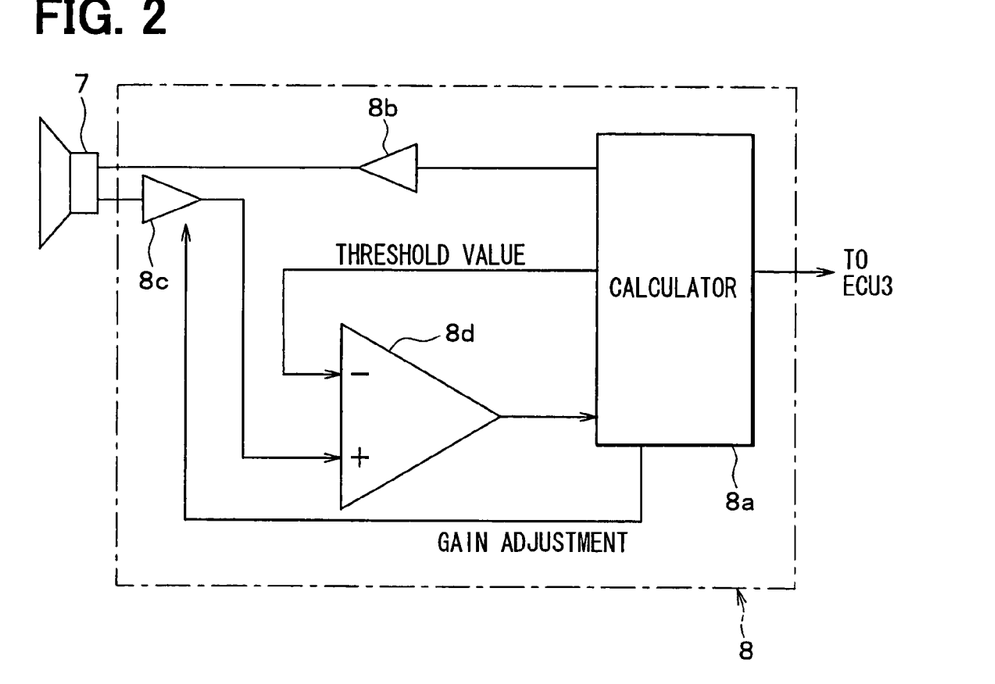
FIG. 2 is a block diagram showing a circuit composition of a signal processing circuit of each of multiple ultrasonic sonars according to the first embodiment.

In this embodiment, each of the multiple sonars 2 is provided with a signal processing circuit 8, in which a control of the sending of the transmitting wave from the microphone 7 and a detection of a distance between the vehicle and an obstacle or the like are performed. In this case, the signal processing circuit 8 can detect the transmitting wave that is reflected by the obstacle, as the receiving wave. Thus, the signal processing circuit 8 can detect the distance between the vehicle and the obstacle based on how long it takes from the sending of the transmitting wave to the receiving of the receiving wave. As shown in FIG. 2, the signal processing circuit 8 is provided with a calculator 8a, a first amplifier 8b, a second amplifier 8c and a comparator 8d (comparing unit).

A command signal from the ECU 3 can be inputted to the calculator 8a, so that the calculator 8a operates according to the content of the command signal. For example, the command signal can be provided with the content that a sending/receiving mode for sending the transmitting wave and receiving the receiving wave is to be set or the content that a receiving mode for only receiving the receiving wave is to be set. Moreover, the calculator 8a can perform the calculation of the distance between the vehicle and the obstacle based on the receiving wave received by the microphone 7.

Specifically, in the case where the command signal has the content that the sending/receiving mode is to be set, the calculator 8a will output a transmitting wave signal to the microphone 7 through the first amplifier 8b, so that the oscillator of the microphone 7 is vibration-excited to generate the transmitting wave.

Moreover, the calculator 8a outputs to the, comparator 8d a voltage which indicates a threshold valve for a discrimination of the obstacle. The threshold value can be set in accordance with ranges which are desirably respectively set as a first field and a second field.

In the case where there exists an obstacle within the first field (that is, distance between obstacle and bumper is smaller than first predetermined value), the alarm is generated in a first manner (e.g., in continuous sound). In the case where there exists an obstacle within a second field (that is, distance between obstacle and bumper is larger than first predetermined value and smaller than second predetermined value), the alarm is generated in a second manner (e.g., in intermittent sound). The second predetermined value is larger than the first predetermined value. In following, the first field and the second field are respectively called a continuous sound field and an intermittent sound field.

Moreover, the calculator 8a receives the output signal of the comparator 8d and detects whether or not there exists the obstacle based on the level of the output signal. Furthermore, the calculator 8a calculates the distance of the obstacle. According to this embodiment, the calculator 8a also outputs a gain adjustment signal (described later) for adjusting a gain of the first amplifier 8b, that is, an amplification rate.

The first amplifier 8b is provided to amplify the transmitting wave signal which is outputted by the calculator 8a for the vibration excitation of the oscillator of the microphone 7.

The second amplifier 8c is provided to amplify the signal received by the microphone 7 at a predetermined gain. The gain of the second amplifier 8c is adjusted based on a gain adjustment signal inputted from the calculator 8a.

According to this embodiment, the gain adjustment signal in the case where the sonar 2 is set to have the sending/receiving mode is different from that in the case where the sonar 2 is set to have the receiving mode (where only receiving of the receiving wave is performed).

For example, when the sonar 2 is set to have the sending/receiving mode, no signal is inputted from the calculator 8a to the second amplifier 8c. When the sonar 2 is set to be the receiving mode, the gain adjustment signal is inputted to the second amplifier 8c from the calculator 8a.

The above-described threshold value is determined with taking reverberation into consideration when the sonar 2 (which is provided with sending/receiving mode) is made generate the transmitting wave. Therefore, when the sonar 2 is provided with the sending/receiving mode, the gain of the second amplifier 8c is determined based on the relation with the threshold value. That is, the gain is determined in such a manner that noise does not exceed the threshold value when noise is amplified at the predetermined gain.

On the other hand, when the sonar 2 is provided with the receiving mode to only receive the receiving wave, the gain of the second amplifier 8c is set to be higher than that when the sonar 2 is provided with the sending/receiving mode, so that the gain can easily exceed the threshold value. That is, the gain is set in such a manner that the sensitivity of the sonar 2 for detecting the obstacle or the like can be improved.

As described above, the second amplifier 8c amplifies the signal received by the microphone 7 to output the amplified signal to the comparator 8d. The comparator 8d compares the amplified signal with the threshold value, and outputs the signal having a level corresponding to the comparison result.

That is, in the case where the amplified signal of the signal having received by the microphone 7 is smaller than the threshold value, the comparator 8d outputs the signal having a low level which indicates that no obstacle exists. In the case where the amplified signal of the signal having received by the microphone 7 is larger than the threshold value, the comparator 8d outputs the signal having a high level which indicates that there exists an obstacle.

It is considered that the timing when the signal having the high level is outputted is the timing when the reflection wave of the transmitting wave is received as the receiving wave. Thus, when the output having the high level of the comparator 8d is inputted to the calculator 8a, the distance between the vehicle and the obstacle can be calculated by the calculator 8a based on the ultrasound speed and the time which elapsed from the outputting of the transmitting wave signal from the calculator 8a to the inputting of the signal having the high level to the calculator 8a. If the distance is within the intermittent sound field or the continuous sound field, a signal indicating that the distance is within the intermittent sound field or the continuous sound field is transmitted from the calculator 8a to the ECU 3.

According to this embodiment, the ECU 3 sets one of the multiple ultrasonic sonars 2 to have the sending/receiving mode to send the transmitting wave and receive the receiving signal, and sets another one thereof to have the receiving mode to only receive the receiving signal. The ECU 3 respectively outputs the command signals to the one of the sonars 2 and the another one thereof, so that the one of the sonars 2 and the another one thereof are set to respectively have the sending/receiving mode and the receiving mode.

Moreover, the ECU 3 receives the signal (outputted from calculator 8a of sonar 2) which indicates that the obstacle exits in the intermittent sound field or the continuous sound field, and outputs a control signal to the alarm unit 4. Thus, an alarm is provided by the alarm unit 4.

At the timing when the detection of the obstacle is demanded, the ECU 3 outputs the command signals to one of the multiple sonars 2 and another one thereof so that the one of the sonars 2 and the another one thereof are respectively set to have the sending/receiving mode and the receiving mode. Thereafter, when the predetermined time has elapsed, that is, it is estimated that that the detection of the obstacle has been completed by the one of the sonars 2 and the another one thereof where the command signals have been sent, the ECU 3 sends command signals to the one of the sonars 2 and the another one thereof so that the one of the sonars 2 and the another one thereof send signals which indicate detection results to the ECU 3. Thus, the detection results from the sonars 2 can be provided for the ECU 3.

The alarm unit 4 can be constructed of, for example, a buzzer, to generate sound or the like. The alarm unit 4 can respectively generate the alarms in different manners (for example, different ringing manners) in accordance with contents of the control signals from the ECU 3.

For example, in the case where the control signal indicating that the obstacle exits within the intermittent sound field is received from the ECU 3, the alarm of the intermittent sound is generated by the alarm unit 4. In the case where the control signal indicating that the obstacle exits within the continuous sound field is received from the ECU 3, the alarm of the continuous sound is generated by the alarm unit 4.

Figure 3:
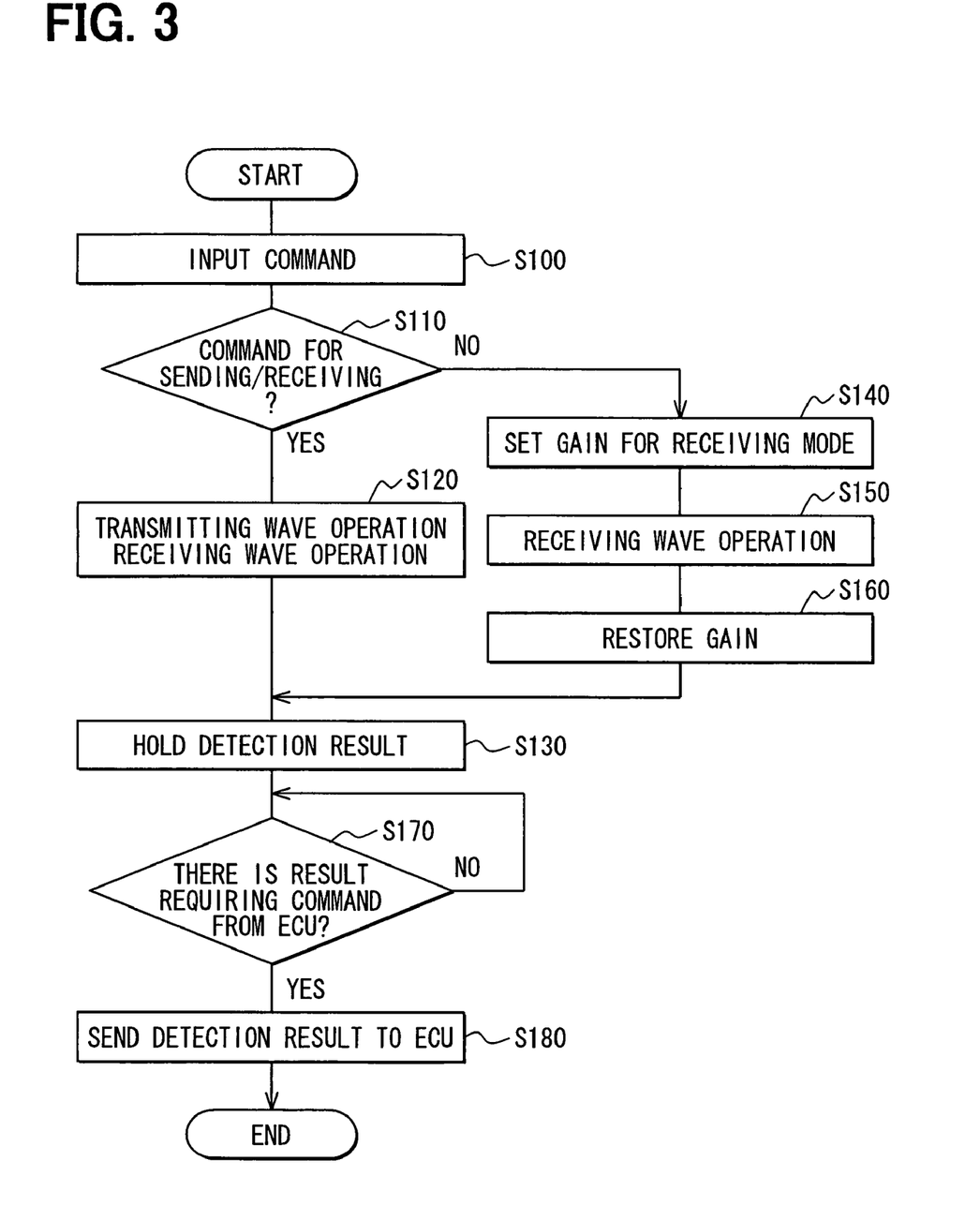
FIG. 3 is a flow chart showing an obstacle detection process performed by a calculator of the ultrasonic sonar according to the first embodiment.

Next, the operation of the obstacle detection system will be described with reference to FIG. 3 which shows an obstacle detection process performed by the calculator 8a of each of the sonars 2. The obstacle detection process shown in FIG. 3 can be executed when an ignition switch (not shown) of the vehicle becomes ON.

At first, at step S100, a procedure for inputting the command signal (which indicates that the sending/receiving mode or the receiving mode is to be set) sent by the ECU 3 to the calculator 8a is executed. In this case, for the sonars 2 where neither of the sending/receiving mode and the receiving mode is set, step S100 will be repeated until the command signal is sent thereto.

Then, at step S110, it is determined whether or not the command signal having been inputted at step S100 is the signal indicating that the sending/receiving mode is to be set. In the case where it is determined that the command signal having been inputted at step S100 is the signal indicating that the sending/receiving mode (that is, determining result of step S110 is "YES") is to be set, step S120 will be performed.

At step S120, the transmitting wave operation and the receiving wave operation are performed. That is, the transmitting wave signal is transmitted from the calculator 8a to the microphone 7 through the first amplifier 8b, and the receiving of the receiving wave is performed after the transmitting wave of the ultrasound is generated. Then, the distance between the vehicle and the obstacle is calculated based on the ultrasound speed and the time which elapsed from the generating of the transmitting wave to the receiving of the receiving wave, specifically, the time which elapsed from the outputting of the transmitting wave to the outputting of the signal having the high level by the comparator 8d. It is determined that the distance is within the intermittent sound filed or within the continuous sound filed. Thereafter, at step S130, the determining result is temporarily held as a detection result.

On the other hand, in the case where it is determined that the command signal having been inputted at step S100 is not the signal indicating that the sending/receiving mode (that is, determining result of step S110 is "NO") is to be set, step S140 will be performed. At step S104, the gain adjustment signal for setting the gain at the receiving mode (where only the receiving is performed) is outputted. The gain adjustment signal is provided to adjust the gain of the first amplifier 8b. In this case, the gain adjustment signal is set to be larger than that in the case where the sonar 2 is set to have the sending/receiving mode, so that the amplified signal (which is acquired by amplifying signal having received by the microphone 7) easily exceeds the threshold value. That is, the gain is set in such a manner that the sensitivity for detecting the obstacle or the like of the sonar 2 can be improved.

Thereafter, at step S150, the receiving wave operation similar to that at step S120 is performed. However, in this case, because the sonar 2 is set to have the receiving mode to only receive the receiving wave without performing the transmitting wave operation, the time which elapsed from the outputting of the transmitting wave to the receiving of the receiving wave can be calculated by attaining (through LAN cable 5) the timing of the outputting of the transmitting wave by the sonar 2 which is provided with the sending/receiving mode, or by estimating the timing when the command input is received at step S100 as the output timing of the transmitting wave.

Thereafter, at step S160, the gain is restored by, for example, stopping the output of the gain adjustment signal. Then, step S130 is performed. At step S130, the detection result is temporarily held.

After step S130 is performed, step S170 will be performed. At step S170, it is determined whether or not the command signal (detection result requiring command) indicating the requirement of the detection result from the ECU 3 has been received.

As described above, the ECU 3 sends the command signal for requiring the sending of the signal indicating the detection result, when the predetermined time has elapsed, that is, when it is estimated that the detection of the obstacle by the sonar 2 has been finished. Therefore, the calculator 8a determines whether or not the command signal from the ECU 3 has been received. In the case where it is determined that the command signal has been received (that is, determining result at step S170 is "YES"), step S180 will be performed. In the case where it is determined that the command signal has not been received (that is, determining result at step S170 is "NO"), step S170 will be repeated.

At step S180, the signal indicating the detection result is sent to the ECU 3. Based on this signal, the ECU 3 outputs the control signal to the alarm unit 4 so that the alarm unit 4 provides the alarm in accordance with the detection result (that is, whether or not the obstacle exists in the intermittent sound field or the continuous sound field).

Thus, in the case where the obstacle exists in the intermittent sound field, the alarm unit 4 informs the driver or the like that the obstacle is near the vehicle by generating the intermittent sound. In the case where the obstacle exists in the continuous sound field, the alarm unit 4 informs the driver that the obstacle is significantly near the vehicle by generating the continuous sound.

When a predetermined time has elapsed from the performing of step S180, the above-described process will be repeated from step S100 by the calculator 8a of each of the sonars 2.

Figure 4A:
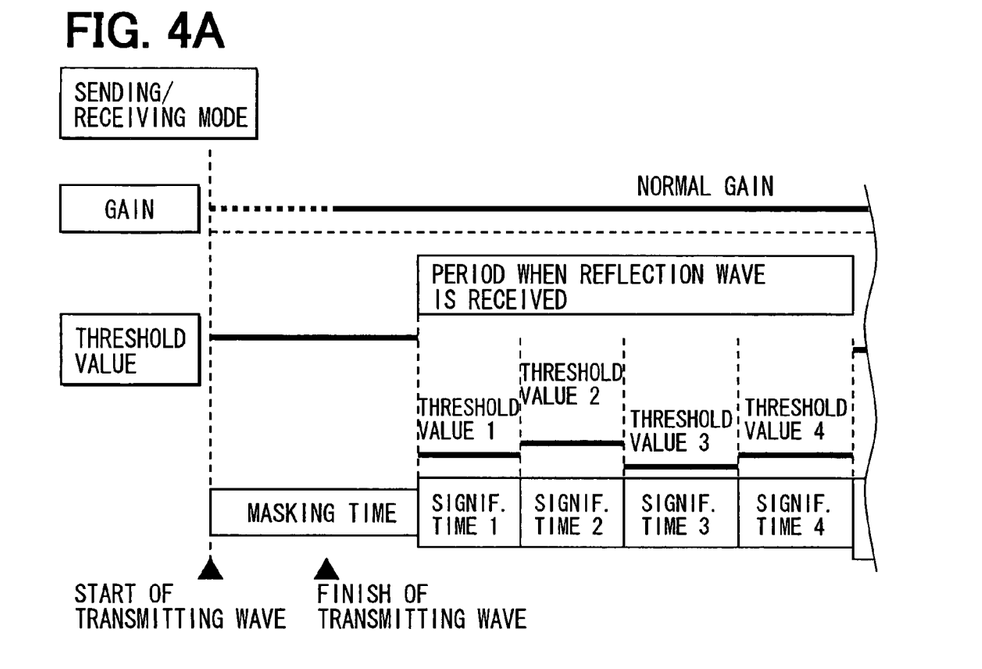
FIG. 4A is a timing chart showing a relation between a threshold value and a gain of the ultrasonic sonar which is set to have a sending/receiving mode according to the first embodiment.
Figure 4B:
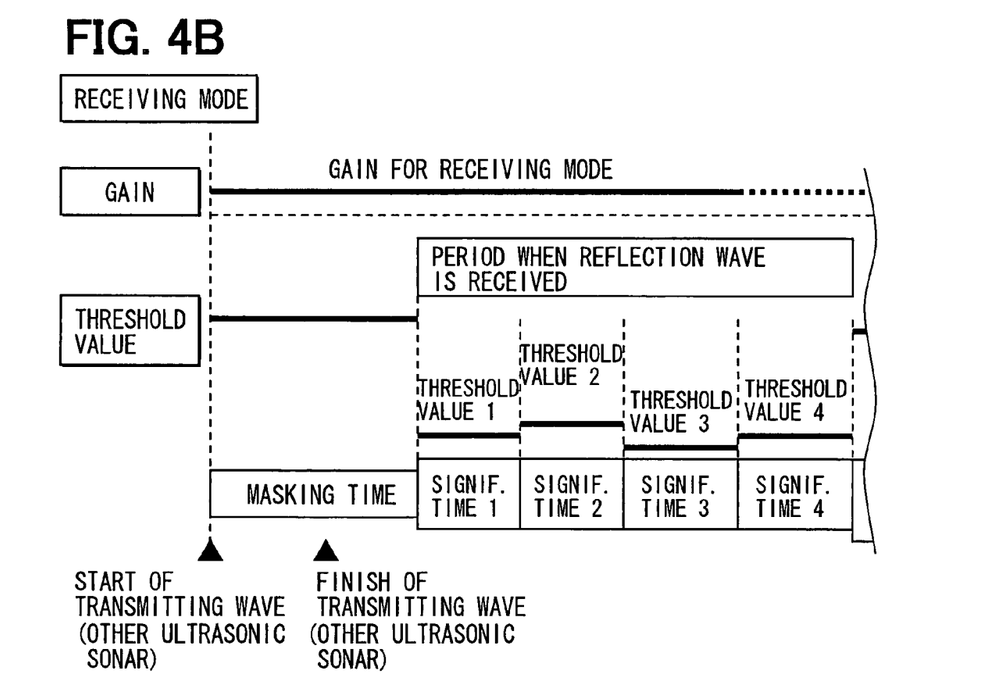
FIG. 4B is a timing chart showing a relation between the threshold value and the gain of the ultrasonic sonar which is set to have a receiving mode according to the first embodiment.

FIG. 4A is a timing chart showing the relation between the gain and the threshold value of the sonar 2 provided with the sending/receiving mode when the above-described process is performed. FIG. 4B is a timing chart showing the relation between the gain and the threshold value of the sonar 2 provided with the receiving mode when the above-described process is performed.

With reference to FIGS. 4A and 4B, the period from the start of the sending of the transmitting wave until the reverberation disappeared is set as a masking time. In this case, the ECU 3 masks a comparison of the comparator 8d from the sending of the transmitting wave until the mask time elapsed, and calculates the distance after the mask time elapsed.

After the masking time has elapsed, the threshold value is compared with the amplified signal which is acquired by amplifying the receiving wave at the predetermined gain. At this time, the threshold value is set with taking noise into consideration. Specifically, because noise which may occurs in accordance with the distance from the vehicle is known, the threshold value can be set so that noise can be discriminated from an obstacle.

For example, because the time which elapsed from the outputting of the transmitting wave to the receiving of the receiving wave corresponds to the distance from the vehicle, the multiple threshold values (e.g., first threshold value, second threshold value, third threshold value and fourth threshold value shown in FIGS. 4A and 4B) can be set in accordance with the noise which is estimated respectively for multiple significant times (e.g., first significant time, second significant time, third significant time and fourth significant time shown in FIGS. 4A and 4B) during the period when the reflection wave (receiving wave) is received. In this case, the multiple threshold values can be respectively set by the multiple threshold voltages.

Thus, when the threshold value used for determining whether or not the obstacle exits is compared with the amplified signal (acquired by amplifying receiving wave at predetermined gain), the gain (when signal received by microphone 7 is amplified) in the case where the sonar 2 is set to have the receiving mode is higher than that in the case where the sonar 2 is set to have the sending/receiving mode. Thus, the sensitivity for detecting the obstacle of the sonar 2 can be improved.

According to this embodiment, the multiple sonars 2 are arranged closed to each other in the vehicle width direction, so that the continuous sound fields of the ultrasonic sonars 2 are continuous with each other.

Figure 5:
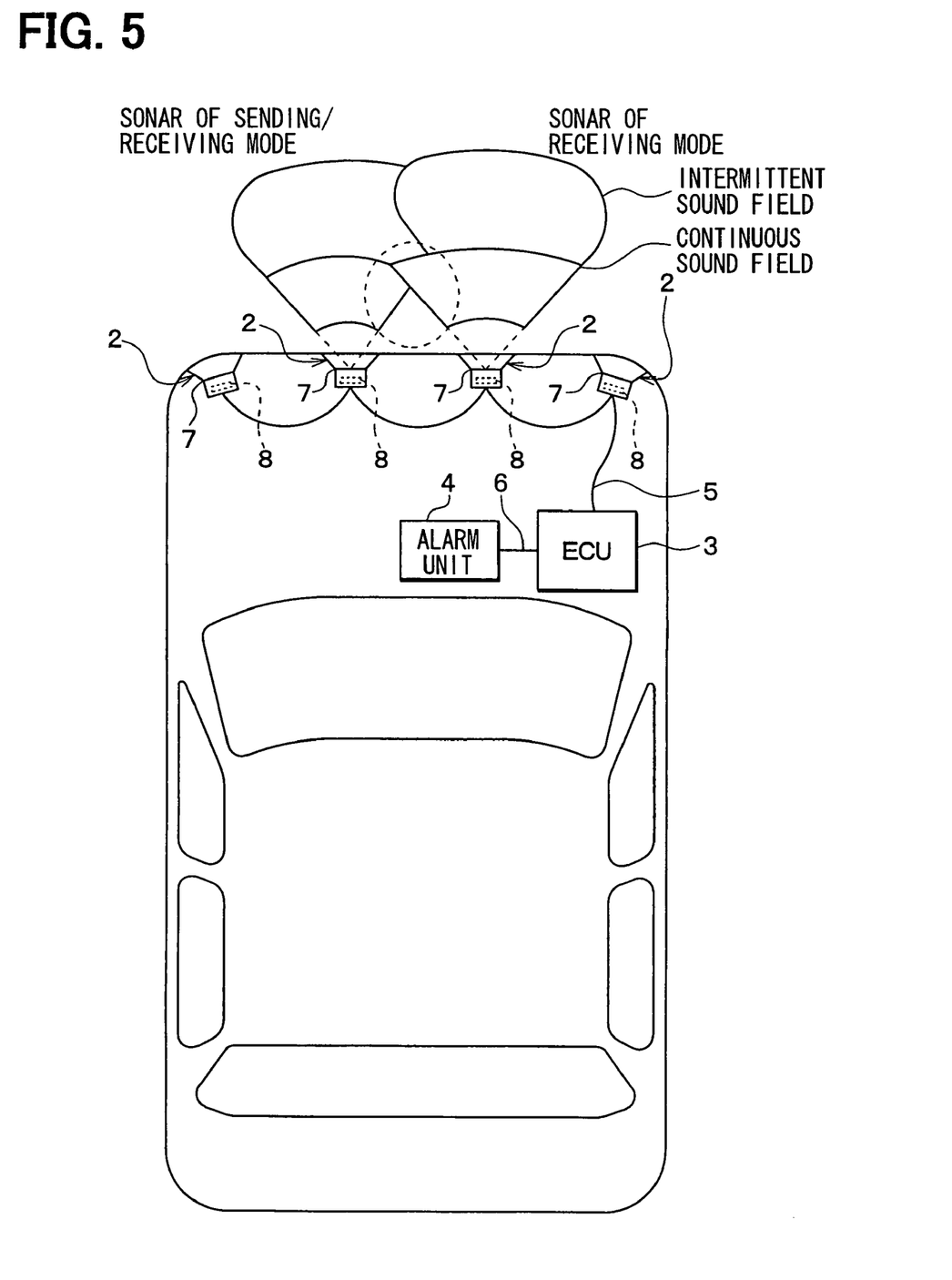
FIG. 5 is a schematic view showing a state of a continuous sound field and an intermittent sound field where the obstacle detection system has different alarming manners according to the first embodiment.

FIG. 5 shows the intermittent sound field and the continuous sound field of the obstacle detection system which is provided with the alarm unit 4 having the different ringing manners in these fields.

In this embodiment, the sonar 2 which is set to have the receiving mode is provided with the higher gain to have a higher detection sensitivity. Therefore, with reference to FIG. 5, at the part (which is surrounded by broken line in FIG. 5) where the continuous sound fields of the two adjacent sonars 2 border each other, the continuous sound field of the sonar 2 which is provided with the receiving mode can be broadened to be overlapped with that of the adjacent sonar 2 which is provided with the sending/receiving mode.

Accordingly, the boundary between the continuous sound field and the intermittent sound field becomes flat as compared with the case shown in FIG. 7. That is, the periphery (border) of the continuous sound field of the obstacle detection system has a substantially even distance from the vehicle. Therefore, the detection distance (between obstacle and vehicle) of the obstacle detection system can become even.

Second Embodiment

In the above-described first embodiment, the gain when the signal received by the microphone 7 is amplified is adjusted so that the sonar 2 which is set to have the receiving mode has an improved sensitivity for detecting the obstacle.

Alternatively, according to a second embodiment of the present invention, the threshold value for determining whether or not the obstacle exists in the case where the sonar 2 is set to have the receiving mode can be set smaller than that in the case where the sonar 2 is set to have the sending/receiving mode.

In this case, even when the threshold value for determining whether or not the obstacle exists is lowered, the sensitivity for detecting the obstacle by the sonar 2 which is set to have the receiving mode can be improved. Thus, the similar effects to the first embodiment can be provided.

Third Embodiment

In the above-described first and second embodiments, the gain when the signal received by the microphone 7 is amplified and the threshold value for determining whether or not the obstacle exits are adjusted. According to a third embodiment of the present invention, additionally, the masking time can be also adjusted.

As described above, the masking time from the start of the outputting of the transmitting wave until the reverberation disappeared is set. However, it is unnecessary to consider the reverberation for the sonar 2 which is set to have the receiving mode. Therefore, if the masking time is shortened for the sonar 2 which is set to have the receiving mode, the receiving of the receiving wave can be early performed due to the shortening of the masking time. Thus, the obstacle in the range having a shorter distance from the vehicle can be detected.

Other Embodiment

Although the present invention has been fully described in connection with the preferred embodiments thereof with reference to the accompanying drawings, it is to be noted that various changes and modifications will become apparent to those skilled in the art.

In the first embodiment, the gain when the signal received by the microphone 7 is amplified is adjusted. In the second embodiment, the threshold value for determining whether or not the obstacle exits is adjusted. However, the gain and the threshold value can be simultaneously adjusted.

Moreover, the gain and the threshold value are exampled in the above-described embodiments. However, the gain and the threshold value can be also suitably adjusted. For example, in the first embodiment, the gain when the signal received by the microphone 7 is amplified in the case where the sonar 2 is set to have the receiving mode is set higher than that in the case where the sonar 2 is set to have the sending/receiving mode. However, the adjustment of the gain can be not constantly performed in the period when the reflection wave is received. For example, the adjustment of the gain can be performed only during a part of this period.

Figure 6:
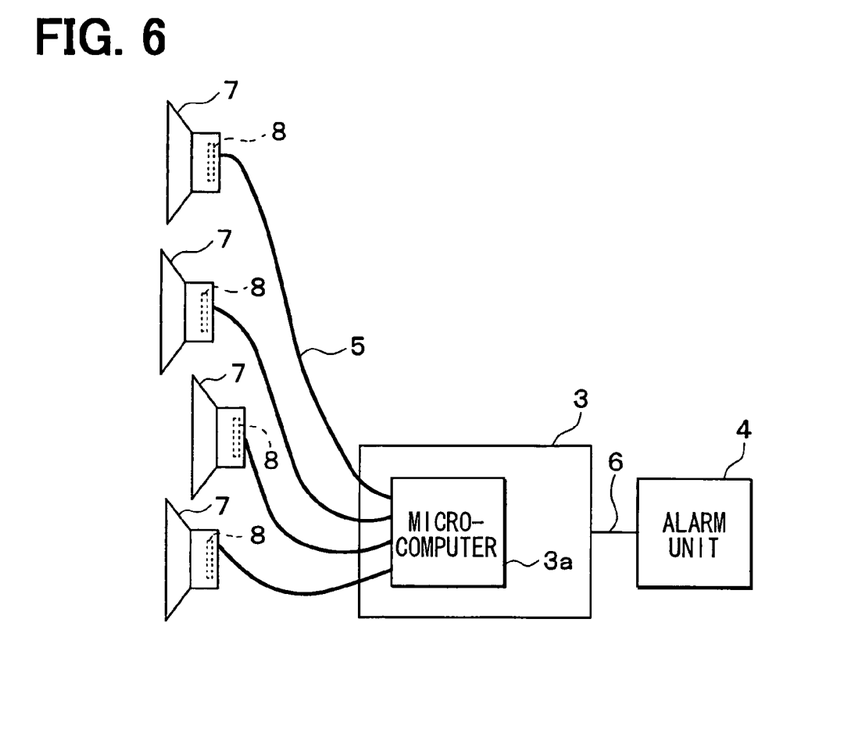
FIG. 6 is a block diagram showing a construction of an obstacle detection system according to other embodiment of the present disclosure.

Furthermore, in the above-described embodiments, the calculator 8*a* is provided for the signal processing circuit 8 of the sonar 2. The calculator 8*a*, for example, adjusts the gain and the threshold value with the modes being switched, and calculates the distance between the vehicle and the obstacle. However, the adjustment and the calculation can be also performed by the ECU 3. For example, with reference to FIG. 6, the sonars 2 can be respectively connected with a microcomputer 3*a* of the ECU 3 through the LAN cables 5. The ECU 3*a* outputs the transmitting wave signal and the gain adjustment signal and the signal indicating the threshold value, and receives the amplified signals which are respectively acquired by amplifying the receiving wave from the multiple sonars 2 at the predetermined gain. In this case, the microcomputer 3*a* functions as a calculation unit for calculating the distance between the vehicle to the obstacle, the gain adjustment unit for adjusting the gain, and the threshold value adjusting unit for adjusting the threshold value.

Moreover, in the above-described embodiments, the alarm unit 4 is exampled to be constructed of the buzzer or the like to generate the sound to inform the driver or the like about the obstacle. However, the alarm unit 4 can also provide the alarm by other manner. For example, the alarm unit 4 can be constructed of an alarm lamp having a LED, or a displayer such as a navigation device, or the like. Specifically, according to the content of the control signal from the ECU 3, the flashing speed and the flashing color of the alarm lamp can be changed or the display content of the displayer can be changed, so that the different alarms can be provided.

Such changes and modifications are to be understood as being in the scope of the present invention as defined by the appended claims.

What is claimed is:

1. An obstacle detection system, comprising:
a plurality of ultrasonic sonars which are mounted to a vehicle and arrayed thereat, each of the ultrasonic sonars having a microphone for sending ultrasound as transmitting wave and receiving reflection wave reflected by an obstacle from the sending wave as receiving wave;
a control unit for determining one of the ultrasonic sonars to be provided with a sending/receiving mode for sending the transmitting wave and receiving the receiving wave and another one of the ultrasonic sonars adjacent to the one thereof to be provided with a receiving mode for only receiving the receiving wave;
an alarm unit for providing an alarm in according with a distance between the vehicle and the obstacle;
an amplifier for amplifying a signal received by the microphone to output an amplified signal;
a comparison unit for comparing the amplified signal with a threshold value used for determining whether or not the obstacle exists;
a calculation unit for calculating the distance between the vehicle and the obstacle; and
a gain adjustment unit for adjusting a gain at which the signal received by the microphone is amplified by the amplifier, wherein:
when it is determined by the comparison unit that the amplified signal is larger than the threshold value, the receiving wave which is received is determined to be the reflection wave from the transmitting wave which is reflected, and the calculation unit calculates the distance between the vehicle and the obstacle based on a time which elapsed from sending of the transmitting wave to receiving of the receiving wave; and
the another one of the ultrasonic sonars which is set to have the receiving mode by the control unit is provided with the gain, which is adjusted by the gain adjustment unit to be higher than the gain of the one of the ultrasonic sonars which is set to have the sending/receiving mode.

2. An obstacle detection system, comprising:
a plurality of ultrasonic sonars which are mounted to a vehicle and arrayed thereat, each of the ultrasonic sonars having a microphone for sending ultrasound as transmitting wave and receiving reflection wave reflected by an obstacle from the sending wave as receiving wave;
a control unit for determining one of the ultrasonic sonars to be provided with a sending/receiving mode for sending the transmitting wave and receiving the receiving wave and another one of the ultrasonic sonars adjacent to the one thereof to be provided with a receiving mode for only receiving the receiving wave;
an alarm unit for providing an alarm in according with a distance between the vehicle and the obstacle;
an amplifier for amplifying a signal received by the microphone to output an amplified signal;
a comparison unit for comparing the amplified signal with a threshold value used for determining whether or not the obstacle exists;
a calculation unit for calculating the distance between the vehicle and the obstacle; and
a threshold value adjustment unit for adjusting the threshold value, wherein:
when it is determined by the comparison unit that the amplified signal is larger than the threshold value, the receiving wave which is received is determined to be the reflection wave from the transmitting wave which is reflected, and the calculation unit calculates the distance between the vehicle and the obstacle based on a time which elapsed from sending of the transmitting wave to receiving of the receiving wave; and the another one of the ultrasonic sonars which is set to have the receiving mode by the control unit is provided with the threshold value, which is adjusted by the threshold value adjustment unit to be smaller than the threshold value of the one of the ultrasonic sonars which is set to have the sending/receiving mode.

3. The obstacle detection system according to claim 2, further comprising a gain adjustment unit for adjusting a gain at which the signal received by the microphone is amplified by the amplifier, wherein the another one of the ultrasonic sonars which is set to have the receiving mode by the control unit is provided with the gain, which is adjusted by the gain adjustment unit to be higher than the gain of the one of the ultrasonic sonars which is set to have the sending/receiving mode.

4. The obstacle detection system according to claim 1, wherein:

the calculation unit masks a comparison by the comparison unit from the sending of the transmitting wave until a masking time elapsed, and calculates the distance after the masking time elapsed; and the another one of the ultrasonic sonars which is set to have the receiving mode by the control unit is provided with the masking time which is shorter than that of the one of the ultrasonic sonars which is set to have the sending/receiving mode.

5. The obstacle detection system according to claim 2, wherein:

the calculation unit masks a comparison by the comparison unit from the sending of the transmitting wave until a masking time elapsed, and calculates the distance after the masking time elapsed; and the another one of the ultrasonic sonars which is set to have the receiving mode by the control unit is provided with the masking time which is shorter than that of the one of the ultrasonic sonars which is set to have the sending/receiving mode.

6. The obstacle detection system according to claim 3, wherein:

the calculation unit masks a comparison by the comparison unit from the sending of the transmitting wave until a masking time elapsed, and calculates the distance after the masking time elapsed; and the another one of the ultrasonic sonars which is set to have the receiving mode by the control unit is provided with the masking time which is shorter than that of the one of the ultrasonic sonars which is set to have the sending/receiving mode.

* * * * *